United States Patent
Asai et al.

(10) Patent No.: US 9,905,867 B2
(45) Date of Patent: *Feb. 27, 2018

(54) FUEL CELL SYSTEM

(71) Applicant: NISSAN MOTOR CO., LTD., Yokohama-shi, Kanagawa (JP)

(72) Inventors: Yoshitomo Asai, Yokohama (JP); Hiroshi Takeda, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 185 days.

This patent is subject to a terminal disclaimer.

(21) Appl. No.: 14/655,993

(22) PCT Filed: Nov. 13, 2013

(86) PCT No.: PCT/JP2013/080704
§ 371 (c)(1),
(2) Date: Jun. 26, 2015

(87) PCT Pub. No.: WO2014/103547
PCT Pub. Date: Jul. 3, 2014

(65) Prior Publication Data
US 2015/0349359 A1 Dec. 3, 2015

(30) Foreign Application Priority Data

Dec. 28, 2012 (JP) .................................. 2012-287934

(51) Int. Cl.
*H01M 8/04* (2016.01)
*H01M 8/04089* (2016.01)
(Continued)

(52) U.S. Cl.
CPC ... *H01M 8/04104* (2013.01); *H01M 8/04089* (2013.01); *H01M 8/04201* (2013.01);
(Continued)

(58) Field of Classification Search
None
See application file for complete search history.

(56) References Cited

U.S. PATENT DOCUMENTS

2006/0144450 A1  7/2006 Hasegawa et al.
2008/0299426 A1* 12/2008 Ando ................ H01M 8/04089
429/414

(Continued)

FOREIGN PATENT DOCUMENTS

JP         02-254260 A      10/1990
JP        2006-164626 A      6/2006
(Continued)

OTHER PUBLICATIONS

Gyan, Stepper Motor Theory of Operation, online Wayback web, date Dec. 18, 2006; {http://gyan.fragnel.ac.in/-dileep/stepperworking.pdf}, 11 pages.

*Primary Examiner* — Ula C Ruddock
*Assistant Examiner* — Amanda Barrow
(74) *Attorney, Agent, or Firm* — Foley & Lardner LLP

(57) ABSTRACT

A fuel cell system sets the larger one of a stack request compressor supply flow rate calculated based on a request of a fuel cell stack and a system request compressor supply flow rate calculated based on a request by the fuel cell system as a target compressor supply flow rate and controls a compressor according to the target compressor supply flow rate. The fuel cell system also controls a bypass valve based on a stack supply flow rate and a target stack supply flow rate to be supplied to the fuel cell stack. The fuel cell system fixes the bypass valve or limits the drive of the bypass valve when the system request compressor supply flow rate is set as the target compressor supply flow rate and the stack supply flow rate becomes smaller than the target stack supply flow rate.

5 Claims, 8 Drawing Sheets

(51) Int. Cl.
*H01M 8/0438* (2016.01)
*H01M 8/04746* (2016.01)
*H01M 8/04082* (2016.01)
*H01M 8/04791* (2016.01)
*H01M 8/1018* (2016.01)

(52) U.S. Cl.
CPC ... *H01M 8/04395* (2013.01); *H01M 8/04753* (2013.01); *H01M 8/04776* (2013.01); *H01M 8/04805* (2013.01); *H01M 2008/1095* (2013.01)

(56) References Cited

U.S. PATENT DOCUMENTS

| | | | | |
|---|---|---|---|---|
| 2009/0098426 | A1* | 4/2009 | Tsuchiya | H01M 8/0438 429/425 |
| 2009/0269628 | A1* | 10/2009 | Imanishi | H01M 8/04089 429/421 |
| 2010/0047663 | A1* | 2/2010 | Manabe | H01M 8/04089 429/414 |
| 2010/0068580 | A1* | 3/2010 | Osada | H01M 8/04089 429/515 |
| 2010/0316926 | A1 | 12/2010 | Ishikawa et al. | |
| 2013/0040219 | A1* | 2/2013 | Naganuma | H01M 8/04014 429/429 |
| 2015/0162629 | A1* | 6/2015 | Tomita | H01M 8/04753 429/413 |

FOREIGN PATENT DOCUMENTS

| | | | | |
|---|---|---|---|---|
| JP | 2006-309970 A | | 11/2006 | |
| JP | 2007-257956 A | | 10/2007 | |
| JP | 2009-076243 A | | 4/2009 | |
| JP | 2009-123550 | * | 6/2009 | ............ H01M 8/04 |
| JP | 2009-123550 A | | 6/2009 | |
| JP | 2010-272375 A | | 12/2010 | |
| JP | 2012-109182 A | | 6/2012 | |
| WO | WO-2008/078553 A1 | | 7/2008 | |
| WO | WO 2011/135610 | * | 11/2011 | ............ H01M 8/04 |

* cited by examiner

FUEL CELL SYSTEM

TECHNICAL FIELD

The present invention relates to a fuel cell system.

BACKGROUND ART

JP2009-123550A describes a conventional fuel cell system in which a part of cathode gas discharged from a cathode compressor is discharged to a cathode gas discharge passage by flowing the part of cathode gas into a bypass passage if the part of cathode gas is unnecessary for power generation of a fuel cell stack. In this way, this conventional fuel cell system controls a flow rate of the cathode gas supplied to the fuel cell stack (stack supply flow rate) to a target stack supply flow rate set according to a power generation request.

SUMMARY OF INVENTION

The above conventional fuel cell system controls an opening of a bypass valve with which the bypass passage has been provided based on the stack supply flow rate and the target stack supply flow rate so that the stack supply flow rate reaches the target stack supply flow rate.

In the fuel cell system in which such a control is executed, the bypass valve may be repeatedly opened and closed near the target stack supply flow rate since the stack supply flow rate cannot coincide with the target stack supply flow rate, particularly when an opening resolution of the bypass valve is coarse. Then, abnormal noise may be generated such as when the bypass valve is a stepping motor. It can be cited as a method for preventing such opening and closing of a bypass valve that the bypass valve is fixed when the stack supply flow rate reaches the vicinity of the target stack supply flow rate.

However, if the bypass valve is fixed in a state where the stack supply flow rate is larger than the target stack supply flow rate, there is a problem that the cathode gas having a flow rate more than necessary for power generation is supplied to the fuel cell stack and the flow rate results in dry electrolyte membranes.

The present invention was developed in view of such a problem and aims to suppress the drying of electrolyte membranes while suppressing the repeated opening and closing of a bypass valve.

According to one aspect of the present invention, a fuel cell system is provided which includes a cathode gas supply passage through which cathode gas is supplied to a fuel cell stack, a compressor provided on the cathode gas supply passage, a bypass passage through which a part of the cathode gas discharged from the compressor is discharged by the bypassing the fuel cell stack, a bypass valve provide on the bypass passage, the bypass valve being configured to adjust a flow rate of the cathode gas flowing through the bypass passage, and stack supply flow rate detecting means configured to detect a stack supply flow rate supplied to the fuel cell stack.

This fuel cell system sets larger one of a stack request compressor supply flow rate and a system request compressor supply flow rate as a target compressor supply flow rate, the stack request compressor supply flow rate being calculated based on a request by the fuel cell stack, the system request compressor supply flow rate being calculated based on a request by the fuel cell system, and the compressor control means being configured to control the compressor according to the set target compressor supply flow rate.

Further, the fuel cell system controls the bypass valve based on the stack supply flow rate and a target stack supply flow rate to be supplied to the fuel cell stack.

The fuel cell system fixes the bypass valve or limits driving of the bypass valve when the system request compressor supply flow rate is set as the target compressor supply flow rate and the stack supply flow rate becomes smaller than the target stack supply flow rate.

DESCRIPTION OF EMBODIMENT

Hereinafter, one embodiment of the present invention is described with reference to the drawings and the like.

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

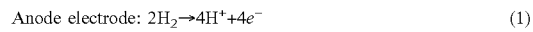

Anode electrode: $2H_2 \rightarrow 4H^+ + 4e^-$ (1)

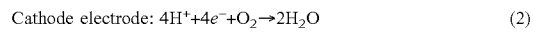

Cathode electrode: $4H^+ + 4e^- + O_2 \rightarrow 2H_2O$ (2)

The fuel cell generates an electromotive force of about 1 volt by these electrode reactions (1) and (2).

In a case of using the fuel cell as a power source for automotive vehicle, a fuel cell stack in which several hundreds of fuel cells are laminated is used since required power is large. By configuring a fuel cell system for supplying the anode gas and the cathode gas to the fuel cell stack, power for driving a vehicle is taken out.

Figure 1:
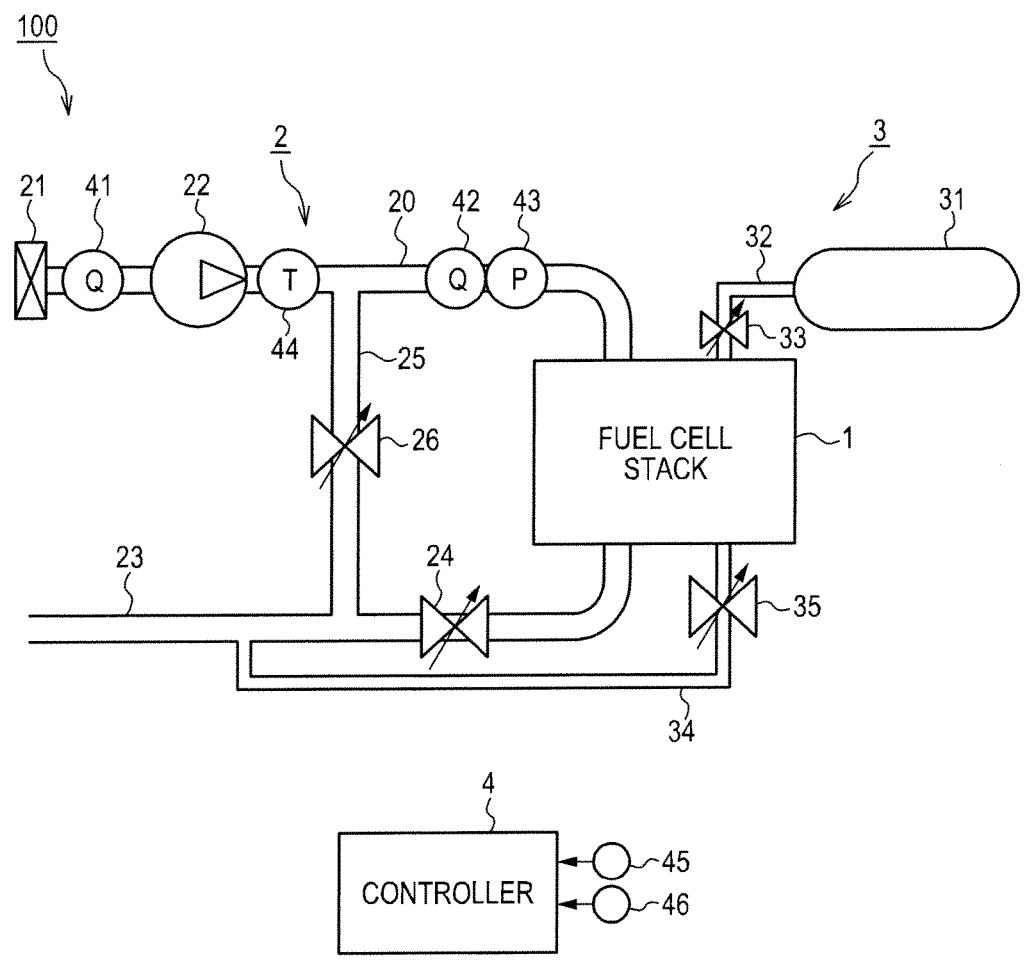
FIG. 1 is a schematic diagram of a fuel cell system according to one embodiment of the present invention.

FIG. 1 is a schematic diagram of a fuel cell system 100 according to one embodiment of the present invention.

The fuel cell system 100 includes a fuel cell stack 1, a cathode gas supplying/discharging device 2, an anode gas supplying/discharging device 3 and a controller 4.

The fuel cell stack 1 is formed by laminating several hundreds of fuel cells and generates power necessary for driving a vehicle upon receiving the supply of the anode gas and the cathode gas.

The cathode gas supplying/discharging device 2 supplies the cathode gas to the fuel cell stack 1 and discharges cathode off-gas discharged from the fuel cell stack 1 to outside air. The cathode gas supplying/discharging device 2 includes a cathode gas supply passage 20, a filter 21, a cathode compressor 22, a cathode gas discharge passage 23, a cathode pressure regulating valve 24, a bypass passage 25, a bypass valve 26, a first flow rate sensor 41, a second flow rate sensor 42, a pressure sensor 43 and a temperature sensor 44.

The cathode gas supply passage 20 is a passage through which the cathode gas to be supplied to the fuel cell stack 1 flows. One end of the cathode gas supply passage 20 is connected to the filter 21 and the other end is connected to a cathode gas inlet hole of the fuel cell stack 1.

The filter 21 removes foreign substances in the cathode gas entering the cathode gas supply passage 20.

The cathode gas supply passage 20 is provided with the cathode compressor 22. The cathode compressor 22 makes air (outside air) of the cathode gas enter into the cathode gas supply passage 20 via the filter 21 and supplies the cathode gas to the fuel cell stack 1.

The cathode gas discharge passage 23 is a passage to which the cathode off-gas discharged from the fuel cell stack 1 flows. One end of the cathode gas discharge passage 23 is connected to a cathode gas outlet hole of the fuel cell stack 1, and the other end is designed as an opening end.

The cathode pressure regulating valve 24 is provided on the cathode gas discharge passage 23. The cathode pressure regulating valve 24 is on-off controlled by the controller 4 so as to adjust a pressure of the cathode gas to be supplied to the fuel cell stack 1 to a desired pressure.

The bypass passage 25 is a provided passage which, if needed, allows a part of the cathode gas discharged from the cathode compressor 22 to be directly discharged to the cathode gas discharge passage 23. The bypass passage 25 can also discharge the part of the cathode gas without via the fuel cell stack 1. One end of the bypass passage 25 is connected to a part of the cathode gas supply passage 20 downstream of the cathode compressor 22 and the other end is connected to a part of the cathode gas discharge passage 23 downstream of the cathode pressure regulating valve 24.

The bypass valve 26 is an on-off valve whose opening is changed in a stepwise manner by each unit opening. The bypass valve 26 is provided at the bypass passage 25. The bypass valve 26 is on-off controlled by the controller 4 to adjust a flow rate of the cathode gas flowing in the bypass passage 25 (hereinafter, referred to as a "bypass flow rate").

The first flow rate sensor 41 is provided at a part of the cathode gas supply passage 20 upstream of the cathode compressor 22. The first flow rate sensor 41 detects a flow rate of the cathode gas to be supplied to (sucked into) the compressor 22 (hereinafter, referred to as a "compressor supply flow rate").

The second flow rate sensor 42 is provided at a part of the cathode gas supply passage 20 downstream of a connected part with the bypass passage 26, i.e. a part of the cathode supply passage 20 near the cathode gas inlet hole of the fuel cell stack 1. The second flow rate sensor 42 detects a flow rate of the cathode gas to be supplied to the fuel cell stack 1 (hereinafter, referred to as a "stack supply flow rate").

The pressure sensor 43 is provided at a part of the cathode gas supply passage 20 downstream of the connected part with the bypass passage 26, i.e. a part of the cathode gas supply passage 20 near the cathode gas inlet hole of the fuel cell stack 1. The pressure sensor 43 detects an inlet pressure of the fuel cell stack 1 (hereinafter, referred to as a "stack inlet pressure").

The temperature sensor 44 is provided at a part of the cathode gas supply passage 20 near a discharge side of the cathode compressor 23. The temperature sensor 44 detects a temperature of the cathode gas discharged from the cathode compressor 22 (hereinafter, referred to as an "intake air temperature").

The anode gas supplying/discharging device 3 supplies the anode gas to the fuel cell stack 1 and discharges anode off-gas discharged from the fuel cell stack 1 to the cathode gas discharge passage 23. The anode gas supplying/discharging device 3 includes a high-pressure tank 31, an anode gas supply passage 32, an anode pressure regulating valve 33, an anode gas discharge passage 34 and a purge valve 35.

The high-pressure tank 31 stores the anode gas, which is to be supplied to the fuel cell stack 1, in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole of the fuel cell stack 1.

The anode pressure regulating valve 33 is provided in the anode gas discharge passage 32. The anode pressure regulating valve 33 is on-off controlled by the controller 4 so as to adjust a pressure of the anode gas to be supplied to the fuel cell stack 1 to a desired pressure.

The anode gas discharge passage 34 is a passage through which the anode off-gas discharged from the fuel cell stack 1 flows. One end of the anode gas discharge passage 34 is connected to an anode gas outlet hole of the fuel cell stack 1 and the other end is connected to the cathode gas discharge passage 23.

The anode-off gas discharged to the cathode gas discharge passage 23 via the anode gas discharge passage 34 is mixed with the cathode off-gas and the cathode gas having flowed through the bypass passage 25 in the cathode gas discharge passage 23 and then is discharged to the outside of the fuel cell system 100. Since the anode off-gas contains extra anode gas (hydrogen) which is not used in the electrode reaction, a hydrogen concentration of exhaust gas is reduced to less than or equal to a predetermined specific concentration if the anode off-gas is mixed with the cathode off-gas and the cathode gas and is discharged to the outside of the fuel cell system 100 in this way.

The purge valve 35 is provided on the anode gas discharge passage 34. The purge valve 35 is on-off controlled by the controller 4 so as to adjust a flow rate of the anode off-gas discharged from the anode gas discharge passage 34 to the cathode gas discharge passage 23.

The controller 4 is configured as a microcomputer including a central processing unit (CPU), a read-only memory (ROM), a random access memory (RAM) and an input/output interface (I/O interface). Signals from various sensors are input to the controller 4. The various sensors include an accelerator operation amount sensor for detecting an accelerator operation amount (hereinafter, referred to as an "accelerator operation amount") 45, an atmospheric pressure sensor 46 for detecting an atmospheric pressure besides the first flow rate sensor 41, the above described second flow rate sensor 42, the pressure sensor 43 and the above described temperature sensor 44.

The controller 4 calculates power required by electrical loads connected to the fuel cell stack 1 (hereinafter, referred to as "required generation power"). The controller 4 calculates the required generation power based on power required by a driving motor (not shown) for driving the vehicle, power required by auxiliary machines such as the cathode compressor 24 and a charge/discharge request of a battery.

Further, the controller 4 feedback-controls the cathode compressor 22 and the bypass valve 26 to simultaneously satisfy a stack request and a dilution request (system request). The stack request mentioned in the present embodiment is a request to cause the fuel cell stack 1 to generate power in an optimal state, considering the ensuring of an oxygen partial pressure, a wet state of electrolyte membranes and the like, in a case of generating the required generation power. The dilution request is a request for setting a hydrogen concentration in exhaust gas discharged to the outside of the fuel cell system 100 to less than or equal to a predetermined concentration.

Figure 2:
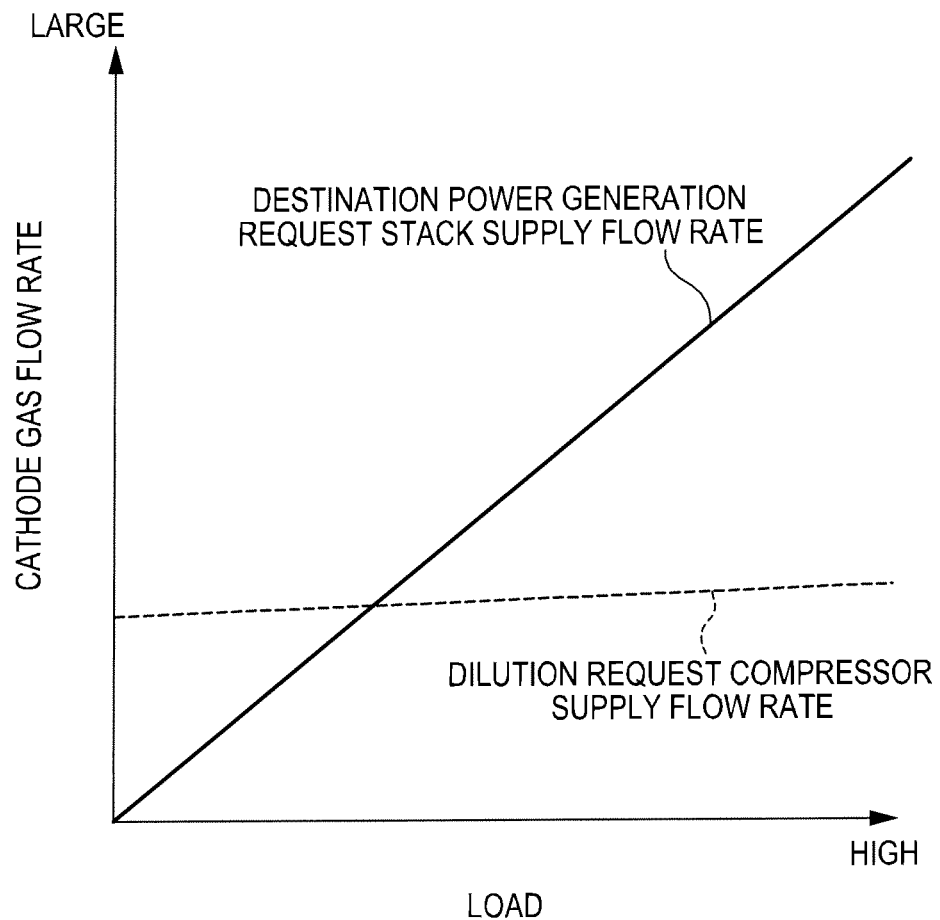
FIG. 2 is a graph showing a relationship of a dilution request compressor supply flow rate and a destination power generation request stack supply flow rate with respect to a load on a fuel cell stack.

FIG. 2 is a graph showing a relationship between a compressor supply flow rate necessary for setting the hydrogen concentration of the exhaust gas discharged to the outside of the fuel cell system 100 to the predetermined concentration (hereinafter, referred to as a "dilution request compressor supply flow rate) or less and a stack supply flow rate for ensuring an oxygen partial pressure necessary for generating the required generation power (hereinafter, referred to as a "destination power generation request stack supply flow rate"), with respect to a load (=required generation power) of the fuel cell stack 1.

As shown in FIG. 2, the destination power generation request stack supply flow rate is larger than the dilution request compressor supply flow rate in middle and high load regions.

Accordingly, in the middle and high load regions, the flow rate of the cathode gas supplied to the fuel cell stack 1 reaches the destination power generation request stack supply flow rate if the cathode compressor 22 is feedback-controlled simply using a target value of the compressor supply flow rate as a target compressor supply flow rate for causing the stack supply flow rate reach the destination power generation request stack supply flow rate (hereinafter, referred to as a "stack request compressor supply flow rate"). Thus, the required generation power can be generated by the fuel cell stack 1. The hydrogen concentration of the exhaust gas can be set to the predetermined concentration or less by diluting the anode off-gas having flowed into the cathode gas discharge passage 23 from the anode gas discharge passage 34 with the cathode off-gas discharged from the fuel cell stack 1.

On the other hand, as shown in FIG. 2, the dilution request compressor supply flow rate is larger than the destination power generation request stack supply flow rate in a low load region.

Accordingly, it is necessary for the cathode compressor 22 to supply the cathode gas more than a cathode gas flow rate (destination power generation request stack supply flow rate) requisite for generating the required generation power by the fuel cell stack 1 in order to set the hydrogen concentration of the exhaust gas to the predetermined concentration or less in the low load region. The supply of the cathode gas is carried out by feedback-controlling the cathode compressor 22 with the target compressor supply flow rate set as the dilution request compressor supply. However, by doing so, excess cathode gas unnecessary for power generation is supplied to the fuel cell stack 1. Thus, the electrolyte member of each fuel cell constituting the fuel cell stack 1 may become dry and thereby power generation efficiency of the fuel cell stack 1 may be reduced.

Thus, if the dilution request compressor supply flow rate becomes larger than the destination power generation request stack supply flow rate, excess cathode gas unnecessary for power generation needs to be flowed into the bypass passage 25 by opening the bypass valve 26 while the cathode compressor 22 is feedback-controlled with the target compressor supply flow rate to which the dilution request compressor supply flow rate is set. That is, the bypass valve 26 needs to be opened so that a bypass flow rate reaches a target bypass flow rate obtained by subtracting the power generation request stack supply flow rate, which is a target value of the stack supply flow rate when the stack supply flow rate is controlled toward the destination power generation request stack supply flow rate, from the dilution request compressor supply flow rate.

However, in the present embodiment, the opening of the bypass valve 26 can only be increased in a stepwise manner by each unit opening. Thus, it may not be possible to make the bypass flow rate coincide with the target bypass flow rate. Then, the bypass valve 26 may be repeatedly opened and closed and the bypass flow rate may fluctuate up and down across the target bypass flow rate to make the bypass flow rate coincide with the target bypass flow rate. As a result, a problem has been found that the compressor supply flow rate might fluctuate up and down in association with a pressure variation caused by the opening and closing the bypass valve 26 to cause a rotational fluctuation of the cathode compressor and thereby the cathode compressor might generate abnormal noise.

To facilitate the understanding of the present invention, a control of a cathode system according to a comparative example is first described below with reference to FIG. 6 before a control of a cathode system according to the present embodiment is described. Then, the cause of such a problem in the control of the cathode system according to the comparative example is described with reference to FIG. 7.

Figure 6:
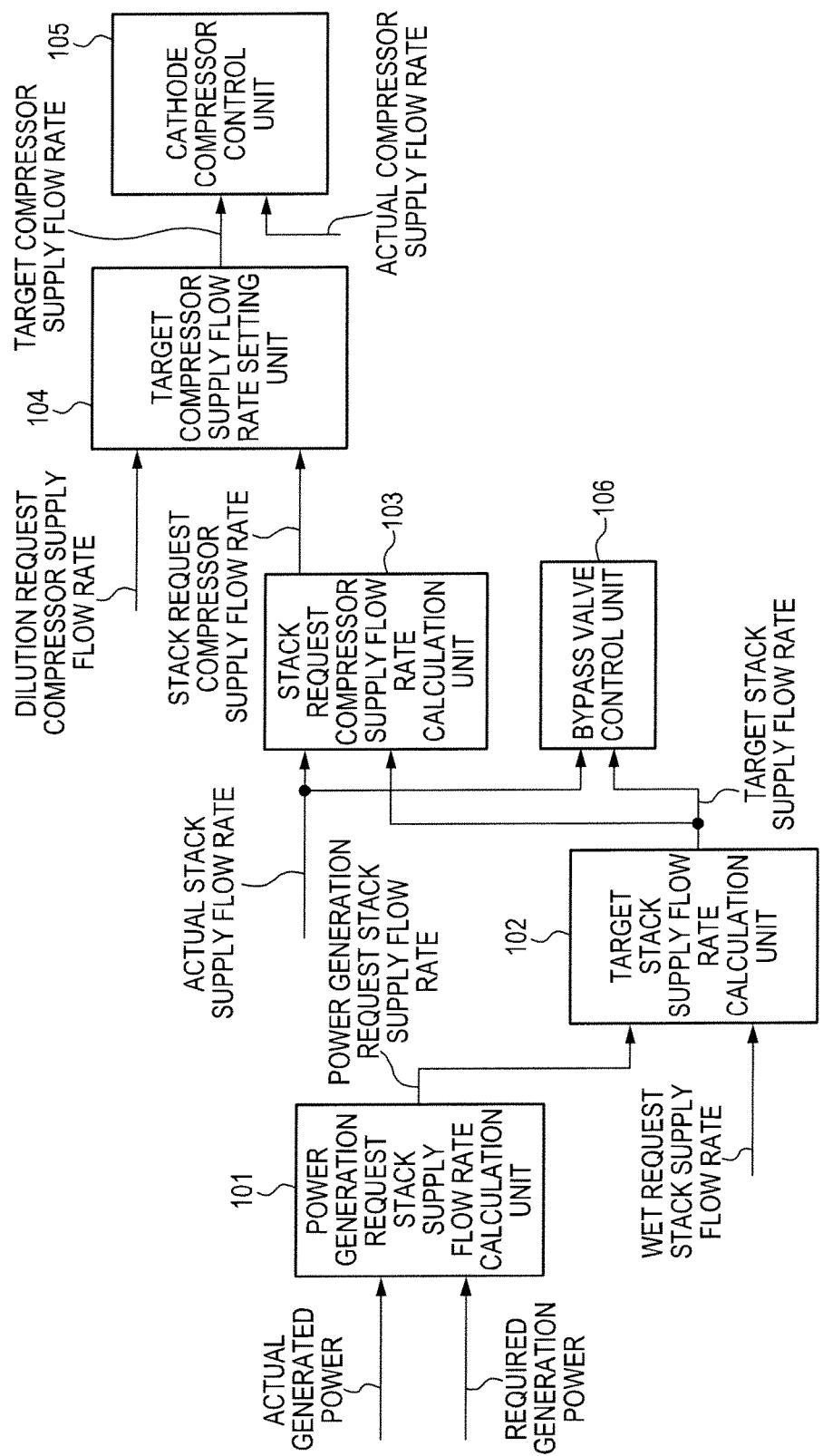
FIG. 6 is a diagram showing a control block of a cathode system according to a comparative example, FIG. 7 are time charts showing a control operation of the cathode system according to the comparative example, and FIG. 8 are time charts showing an operation when a drive of a bypass valve is prohibited when an actual stack supply flow rate falls below a target stack supply flow rate by opening the bypass valve in the control of the cathode system according to the comparative example.

FIG. 6 is a diagram showing a control block of the cathode system according to the comparative example.

The control block of the cathode system according to the comparative example includes a power generation request stack supply flow rate calculation unit 101, a target stack supply flow rate setting unit 102, a stack request compressor supply flow rate calculation unit 103, a target compressor supply flow rate setting unit 104, a cathode compressor control unit 105 and a bypass valve control unit 106.

Actually generated power of the fuel cell stack and required generation power set according to the load on the fuel cell stack 1 are input to the power generation request stack supply flow rate calculation unit 101. The power generation request stack supply flow rate calculation unit 101 sets a stack supply flow rate necessary for making the actually generated power reach the required generation power to the destination power generation request stack supply flow rate. The unit 101 also calculates a target value as the power generation request stack supply flow rate in the case of changing the stack supply flow rate toward the set destination power generation request stack supply flow rate. The power generation request stack supply flow rate is, in other words, a target value of a stack supply flow rate necessary for ensuring an oxygen partial pressure necessary for the electrode reaction in the cathode electrode of each fuel cell when the required generation power is generated in the fuel cell stack 1.

The power generation request stack supply flow rate and a wetness request stack supply flow rate are input to the target stack supply flow rate setting unit 102. Here, the wetness request stack supply flow rate is a stack supply flow rate necessary for controlling a degree of wetness (water content) of the electrolyte membrane to an optimal degree of wetness (required degree of wetness) corresponding to the load on the fuel cell stack 1. The target stack supply flow rate setting unit 102 sets larger one of the power generation request stack supply flow rate and the wetness request stack supply flow rate as the target stack supply flow rate. As just described, the target stack supply flow rate setting unit 102 sets an optimal stack supply flow rate corresponding to the load on the fuel cell stack 1 as the target stack supply flow rate.

A stack supply flow rate detected by the second flow rate sensor 42 (hereinafter, referred to as an "actual stack supply flow rate") and the target stack supply flow rate are input to the stack request compressor supply flow rate calculation unit 103. The stack request compressor supply flow rate calculation unit 103 calculates a target value of the compressor supply flow rate to change the actual stack supply flow rate toward the target stack supply flow rate as a stack request compressor supply flow rate based on a deviation between a target stack supply flow rate and an actual stack supply flow rate. Specifically, the stack request compressor supply flow rate is calculated by executing a PI control according to a component proportional to the deviation between the target stack supply flow rate and the actual stack supply flow rate and according to a component obtained by time-integrating the deviation between the target stack supply flow rate and the actual stack supply flow rate. As just described, the stack request compressor supply flow rate is a compressor supply flow rate necessary for satisfying requests by the fuel cell stack 1 such as the power generation request and the wetness request. That is, the stack request compressor supply flow rate is a target value of the compressor supply flow rate calculated based on the requests by the fuel cell stack 1.

It should be noted that, in the stack request compressor supply flow rate calculation unit 103, when the stack request compressor supply flow rate as an operation amount reaches a lower limit value, a PI control is executed to perform only an integration operation in which the stack request compressor supply flow rate is larger than the lower limit value and to stop an integration operation in which the stack request compressor supply flow rate is smaller than the lower limit value, in order to preventing vibration caused by an excessive integration operation (so-called wind-up phenomenon).

The dilution request compressor supply flow rate determined according to the load on the fuel cell stack 1 and the stack request compressor supply flow rate are input to the target compressor supply flow rate setting unit 104. The target compressor supply flow rate setting unit 104 sets larger one of the dilution request compressor supply flow rate and the stack request compressor supply flow rate as the target compressor supply flow rate. It should be noted that the dilution request compressor supply flow rate is not a request by the fuel cell stack 1, but a target value of a compressor supply flow rate necessary for satisfying a request by the fuel cell system 100 which is to set the hydrogen concentration in the exhaust gas to the predetermined concentration or less. That is, the dilution request compressor supply flow rate is a target value of the compressor supply flow rate calculated based on the request by the fuel cell system 100.

As just described, in the target compressor supply flow rate setting unit 104, the larger one of the dilution request compressor supply flow rate and the stack request compressor supply flow rate is set as the target compressor supply flow rate. Thus, the state in which the dilution request compressor supply flow rate is set as the target compressor supply flow rate is equivalent to a state where the stack request compressor supply flow rate as an operation amount reaches the lower limit value (here, dilution request compressor supply flow rate) in the stack request compressor supply flow rate calculation unit 103.

Thus, when the dilution request compressor supply flow rate is set as the target compressor supply flow rate in the target compressor supply flow rate setting unit 104, the integration operation in which the stack request compressor supply flow rate is smaller than the dilution request compressor supply flow rate is stopped in the stack request compressor supply flow rate calculation unit 103.

That is, the deviation between the target stack supply flow rate and the actual stack supply flow rate is time-integrated in the stack request compressor supply flow rate calculation unit 103 only when the dilution request compressor supply flow rate is set as the target compressor supply flow rate in the target compressor supply flow rate setting unit 104 and the actual stack supply flow rate is smaller than the target stack supply flow rate (stack request compressor supply flow rate needs to be increased). When the actual stack supply flow rate is larger than the target stack supply flow rate (stack request compressor flow rate needs to be decreased), the time-integration of the deviation between the target stack supply flow rate and the actual stack supply flow rate is stopped.

A compressor supply flow rate detected by the first flow rate sensor 41 (hereinafter, referred to as an "actual compressor supply flow rate") and the target compressor supply flow rate are input to the cathode compressor control unit 105. The cathode compressor control unit 105 outputs a control signal for the cathode compressor 22 based on a deviation between the target compressor supply flow rate and the actual compressor supply flow rate so that the actual compressor supply flow rate reaches the target compressor supply flow rate. Specifically, a PI control corresponding to a component proportional to the deviation between the target compressor supply flow rate and the actual compressor supply flow rate and a component obtained by time-integrating the deviation between the target compressor supply flow rate and the actual compressor supply flow rate is executed and a control signal for the cathode compressor 22 is output.

The actual stack supply flow rate and the target stack supply flow rate are input to the bypass valve control unit 106. The bypass valve control unit 106 outputs a drive signal for the bypass valve 26 based on a deviation between the target stack supply flow rate and the actual stack supply flow rate. Specifically, a PI control according to a component proportional to the deviation between the target stack supply flow rate and the actual stack supply flow rate and according to a component obtained by time-integrating the deviation between the target stack supply flow rate and the actual stack supply flow rate is executed to calculate a bypass valve operation amount and a control signal for the bypass valve 26 is output when this bypass valve operation amount exceeds a predetermined amount.

Here, as described above, the opening of the bypass valve 26 can only be increased in a stepwise manner by each unit opening in the present embodiment. Thus, in the control of the cathode system according to the comparative example, the bypass flow rate cannot coincide with the target bypass flow rate and the actual stack supply flow rate cannot coincide with the target stack supply flow rate in some cases when the dilution request compressor supply flow rate is set as the target compressor supply flow rate. The aforementioned problem that occurs in this case is described with reference to FIG. 7.

Figure 7:
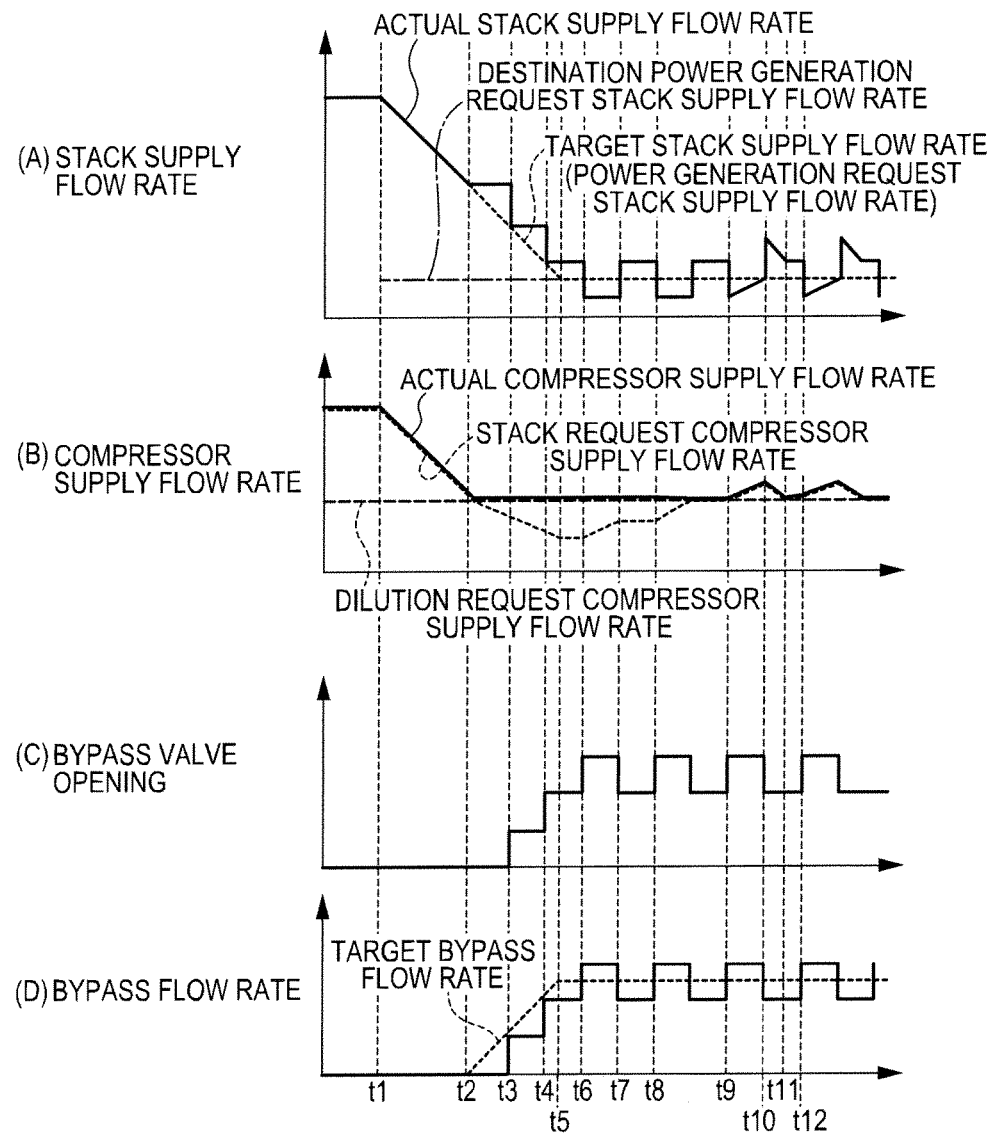

FIG. 7 are time charts showing the operation of the cathode system according to the comparative example to explain the problem occurring when the bypass flow rate cannot coincide with the target bypass flow rate.

If, for example, the accelerator operation amount decreases so as to reduce the required generation power and the destination power generation request stack supply flow rate decreases at time t1, the target stack supply flow rate (power generation request stack supply flow rate) decreases toward the destination power generation request stack supply flow rate (FIG. 7(A)). As a result, the actual stack supply flow rate becomes larger than the target stack supply flow rate, and therefore the stack request compressor supply flow rate calculated by the stack request compressor supply flow rate calculation unit 103 also decreases (FIG. 7(B)). It should be noted that description here is given on the premise that the power generation request stack supply flow rate is larger than the wetness request stack supply flow rate.

Since the stack request compressor supply flow rate is larger than the dilution request compressor supply flow rate during a period from time t1 to time t2, the stack request compressor supply flow rate is set as the target compressor supply flow rate (FIG. 7(B)). As a result, the cathode compressor with good responsiveness is so controlled that the actual compressor supply flow rate reaches the stack request compressor supply flow rate, therefore the actual stack supply flow rate decreases to substantially follow the target stack supply flow rate (FIG. 7(A)).

When the stack request compressor supply flow rate falls below the dilution request compressor supply flow rate at time t2, the dilution request compressor supply flow rate is set as the target compressor supply flow rate and the cathode compressor is so controlled that the actual compressor supply flow rate reaches the dilution request compressor supply flow rate (FIG. 7(B)). As a result, the actual stack supply flow rate becomes constant without decreasing, following the target stack supply flow rate (FIG. 7(A)). Since the target stack supply flow rate is decreasing also after time t2, the actual stack supply flow rate becomes gradually larger than the target stack supply flow rate and the deviation between the target stack supply flow rate and the actual stack supply flow rate becomes gradually larger (FIG. 7(A)).

As the deviation between the target stack supply flow rate and the actual stack supply flow rate becomes gradually larger in this way, a bypass valve operation amount calculated by the PI control of the bypass valve control unit 106 becomes gradually larger. It should be noted that the bypass valve operation amount calculated when the actual stack supply flow rate is larger than the target stack supply flow rate is referred to as an "open-side bypass valve operation amount" and that the bypass valve operation amount calculated when the actual stack supply flow rate is smaller than the target stack supply flow rate is referred to as a "close-side bypass valve operation amount" when it is particularly necessary for distinguishing the valve operation amounts in the following description.

When the open-side bypass valve operation amount exceeds a predetermined amount at time t3, a drive signal for the bypass valve 26 is output and the bypass valve 26 is opened only by the unit opening (FIG. 7(C)). As a result, excess cathode gas supplied to the fuel cell stack 1 flows into the bypass passage 25, the actual stack supply flow rate decreases to the target stack supply flow rate (FIG. 7(A)) and the bypass flow rate increases to the target bypass flow rate (FIG. 7(D)).

However, since the target stack supply flow rate is decreasing also after time t3, the actual stack supply flow rate becomes gradually larger than the target stack supply flow rate again (FIG. 7(A)) and the bypass valve 26 is further opened by the unit opening at time t4 (FIG. 7(C)). As a result, the actual stack supply flow rate decreases to the target stack supply flow rate (FIG. 7(A)) and the bypass flow rate increases to the target bypass flow rate (FIG. 7(D)) again.

When the power generation request stack supply flow rate decreases to the destination power generation request stack supply flow rate and the target stack supply flow rate becomes constant at time t5, the deviation between the target stack supply flow rate and the actual stack supply flow rate becomes constant thereafter (FIG. 7(A)). Since the dilution request compressor supply flow rate is set as the target stack supply flow rate and the actual stack supply flow rate is larger than the target stack supply flow rate at time t5, the operation of the time-integration of the deviation is stopped in the PI control of the stack request compressor supply flow rate calculation unit 103. Thus, the stack request compressor supply flow rate becomes constant (FIG. 7(B)) as the deviation between the target stack supply flow rate and the actual stack supply flow rate becomes constant at time t5.

On the other hand, since the operation of the time-integration of the deviation is performed in the PI control of the bypass valve control unit 106, the open-side bypass valve operation amount calculated by the PI control of the bypass valve control unit 106 increases also after time t5.

When the open-side bypass valve operation amount exceeds a predetermined amount at time t6, a drive signal for the bypass valve 26 is output and the bypass valve 26 is further opened only by the unit opening (FIG. ((C)), but the actual stack supply flow rate cannot be controlled to the target stack supply flow rate this time (bypass flow rate cannot be controlled to the target bypass flow rate) and the actual stack supply flow rate becomes smaller than the target stack supply flow rate (FIG. 7(A)). As a result, the close-side bypass valve operation amount becomes gradually larger this time by the PI control of the bypass valve control unit 106.

Further, when the bypass valve 26 is opened by the unit opening and the actual stack supply flow rate becomes smaller than the target stack supply flow rate at time t6, the operation of the time-integration of the deviation is resumed in the IP control of the stack request compressor supply flow rate calculation unit 103. Thus, the stack request compressor supply flow rate increases (FIG. 7(B)).

When the close-side bypass valve operation amount exceeds a predetermined amount at time t7, a drive signal for the bypass valve 26 is output and the bypass valve 26 is closed by the unit opening this time (FIG. ((C)) and the actual stack supply flow rate becomes larger than the target stack supply flow rate again (FIG. 7(A)).

Further, since the actual stack supply flow rate becomes larger than the target stack supply flow rate when the bypass valve 26 is closed by the unit opening at time t7, the operation of the time-integration of the deviation is stopped and the stack request compressor supply flow rate becomes constant in the stack request compressor supply flow rate calculation unit 103 (FIG. 7(B)). When the bypass valve 26 is opened only by the unit opening and the actual stack supply flow rate becomes smaller than the target stack supply flow rate at time t8, the operation of the time-integration of the deviation is performed again and the stack request compressor supply flow rate increases (FIG. 7(B)).

After time t6, the bypass valve 26 is repeatedly opened and closed in this way and the stack request compressor supply flow rate gradually increases.

When the bypass valve 26 is opened by the unit opening at time t9, the actual stack supply flow rate becomes smaller than the target stack supply flow rate (FIG. 7(A)), therefore the stack request compressor supply flow rate increases (FIG. 7(B)). As a result, the stack request compressor supply flow rate becomes larger than the dilution request compressor supply flow rate (FIG. 7(B)), the stack request compressor supply flow rate is set as the target compressor supply flow rate and the actual compressor supply flow rate increases (FIG. 7(B)).

When the bypass valve 26 is closed only by the unit opening at time t10, the actual stack supply flow rate increases by that much. As a result, the actual stack supply flow rate becomes larger than the target stack supply flow rate (FIG. 7(A)) and the stack request compressor supply flow rate decreases this time (FIG. 7(B)).

When the stack request compressor supply flow rate decreases to the dilution request stack request compressor flow rate at time t11 (FIG. 7(B)), the cathode compressor is so controlled that the actual compressor supply flow rate reaches the dilution request compressor flow rate, and the actual compressor supply flow rate becomes constant (FIG. 7(B)). Since the actual stack supply flow rate is larger than the target stack supply flow rate during a period from time t11 to time t12 (FIG. 7(A)), the operation of the time-integration of the deviation in the stack request compressor supply flow rate calculation unit 103 is stopped. Thus, the stack request compressor supply flow rate remains constant at the dilution request compressor supply flow rate (FIG. 7(B)).

When the bypass valve 26 is opened only by the unit opening at time t12 (FIG. 7(C)), the stack request compressor supply flow rate becomes larger than the dilution request compressor supply flow rate again (FIG. 7(B)), the stack request compressor supply flow rate is set as the target compressor supply flow rate and the actual compressor supply flow rate increases (FIG. 7(B)).

By repeatedly opening and closing the bypass valve 26 in this way, the actual compressor supply flow rate finally fluctuates up and down as after time t9 to cause a rotational fluctuation of the cathode compressor 22, whereby abnormal noise is generated from the cathode compressor 22.

Here, a method for fixing the bypass valve 26 by prohibiting the drive of the bypass valve 26 in a state where the deviation between the actual stack supply flow rate and the target stack supply flow rate is not larger than a predetermined amount, i.e. in a state where the actual stack supply flow rate falls below the target stack supply flow rate if the bypass valve 26 is opened is, for example, a method for preventing the bypass valve 26 from being repeatedly opened and closed.

However, in such a method, although the bypass valve 26 can be prevented from being repeatedly opened and closed, there is a problem that the actual stack supply flow rate cannot coincide with the target stack supply flow rate. This problem is described below with reference to FIG. 8.

Figure 8:
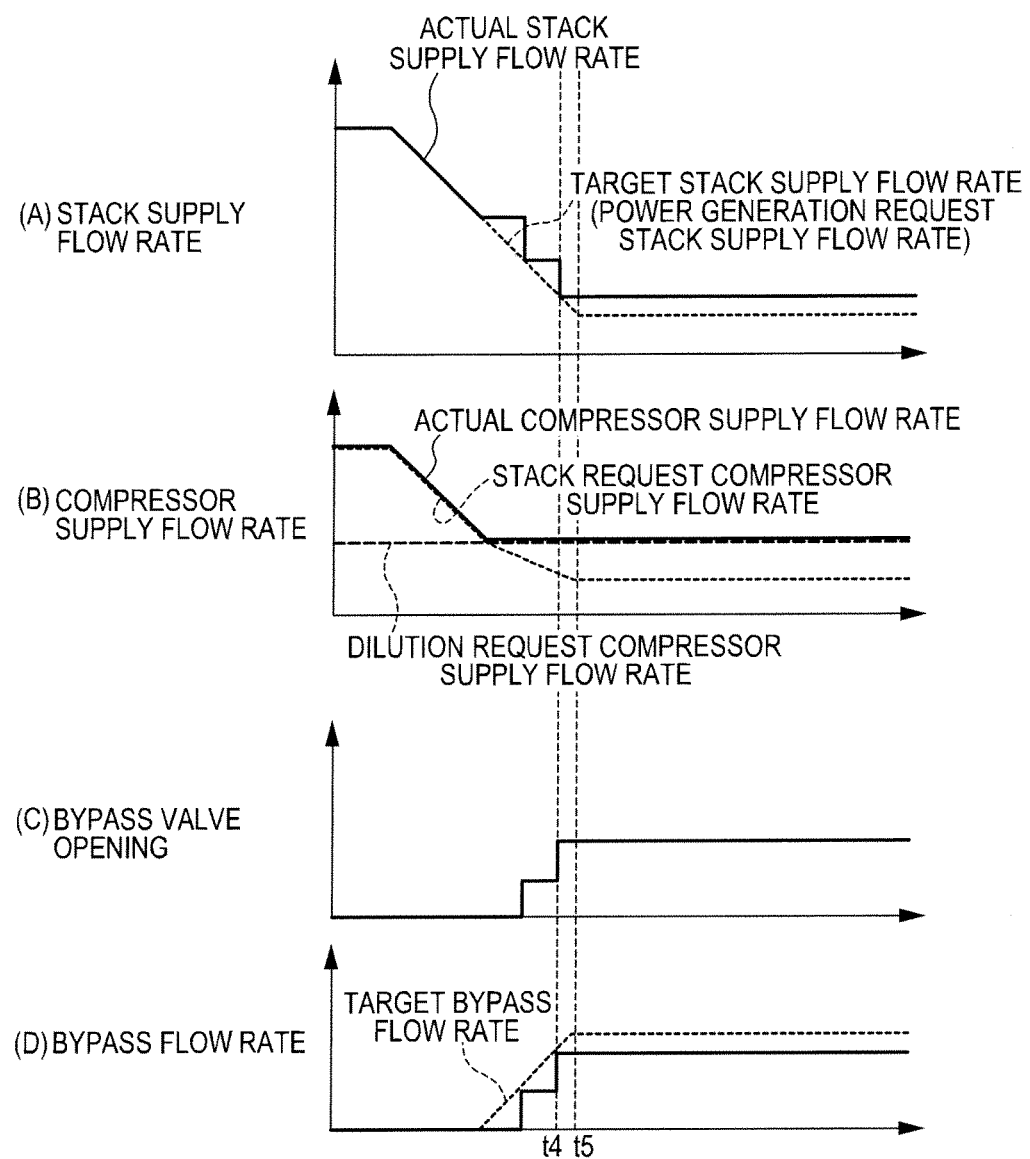

FIG. 8 are time charts showing an operation when the drive of the bypass valve 26 is prohibited in the case where the actual stack supply flow rate falls below the target stack supply flow rate if the bypass valve 26 is opened in the control of the cathode system according to the comparative example.

As shown in FIG. 8, after time t4, the deviation between the actual stack supply flow rate and the target stack supply flow rate is not larger than the predetermined amount, i.e. the actual stack supply flow rate falls below the target stack supply flow rate if the bypass valve 26 is opened. Thus, if the drive of the bypass valve 26 is prohibited after time t4, the deviation between the target stack supply flow rate and the actual stack supply flow rate becomes constant in a state where the dilution request compressor supply flow rate is set as the target stack supply flow rate and the actual stack supply flow rate is larger than the target stack supply flow rate after time t5.

Then, in the PI control of the stack request compressor supply flow rate calculation unit 103, the operation of the time-integration of the deviation between the target stack supply flow rate and the actual stack supply flow rate is stopped. Accordingly, the stack request compressor supply flow rate is constant after time t5 (FIG. 8(B)). Thus, the dilution request compressor supply flow rate continues to be set as the target stack supply flow rate, therefore it becomes impossible to make the actual stack supply flow rate coincide with the target stack supply flow rate.

If the actual stack supply flow rate cannot coincide with the target stack supply flow rate as just described, the electrolyte membrane of each fuel cell becomes excessively dry or excessively wet, whereby power generation efficiency is reduced.

Accordingly, in the present embodiment, a timing at which the drive of the bypass valve 26 is prohibited (bypass valve 26 is fixed) is more finely set so that the actual stack supply flow rate can coincide with the target stack supply flow rate while the bypass valve 26 is prevented from being repeatedly opened and closed in this way. The control of the cathode system according to the present embodiment is described below.

Figure 3:
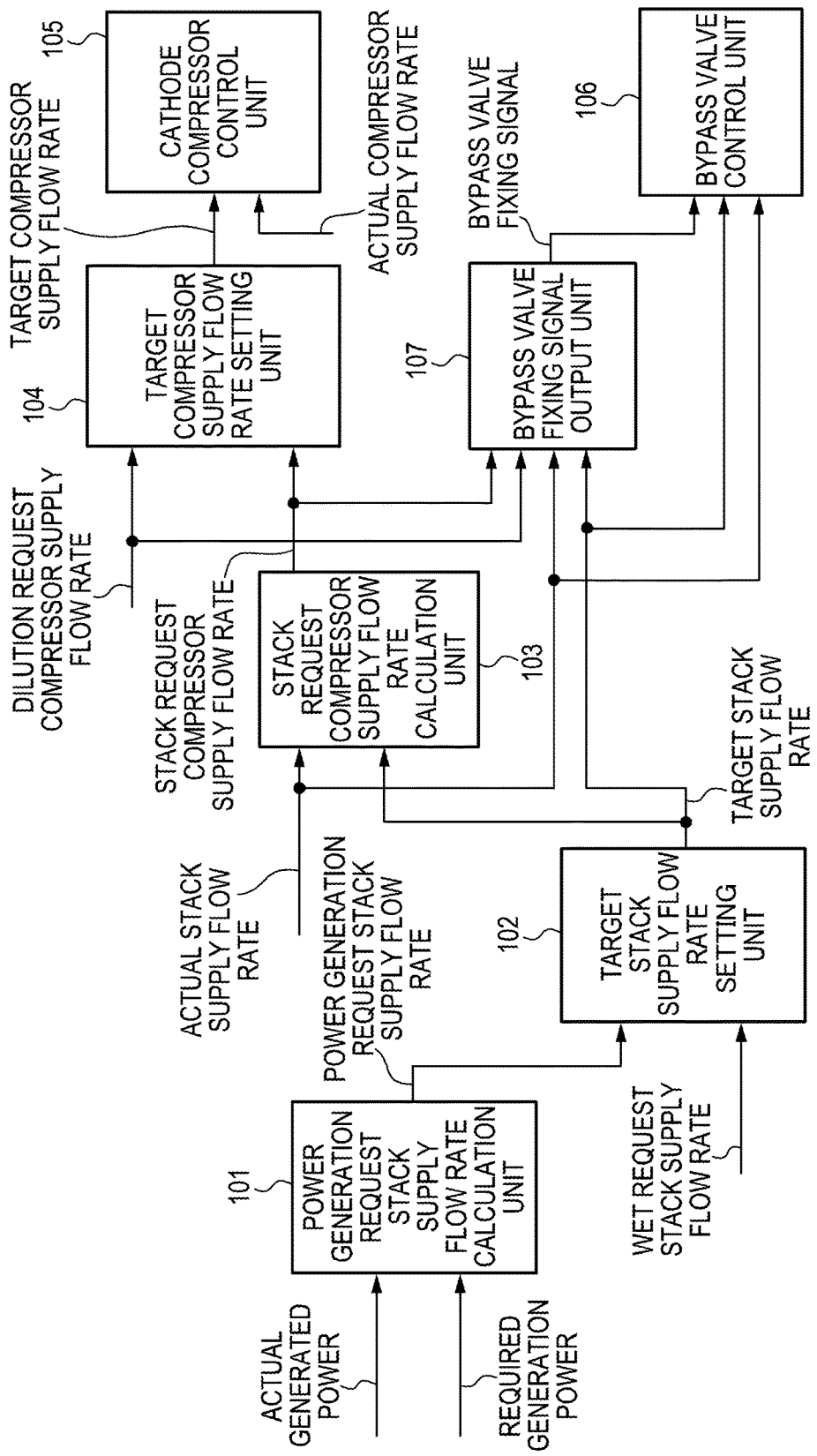
FIG. 3 shows a control block of a cathode system according to the present embodiment.

FIG. 3 is a diagram showing a control block of the cathode system according to the present embodiment. It should be noted that, in the control block of the cathode system according to the present embodiment, repeated description of components fulfilling functions similar to those of the control block of the cathode system according to the comparative example is omitted as appropriate by using the same reference signs.

The control block of the cathode system according to the present embodiment further includes a bypass valve fixing signal output unit 107.

An actual stack supply flow rate, a target stack supply flow rate, a dilution request compressor supply flow rate and a stack request compressor supply flow rate are input to the bypass valve fixing signal output unit 107. The bypass valve fixing signal output unit 107 outputs a bypass valve fixing signal to fix the bypass valve 26 at the current position by prohibiting the drive of the bypass valve 26 based on these input signals. The bypass valve fixing signal is input to a bypass valve control unit 106.

Figure 4:
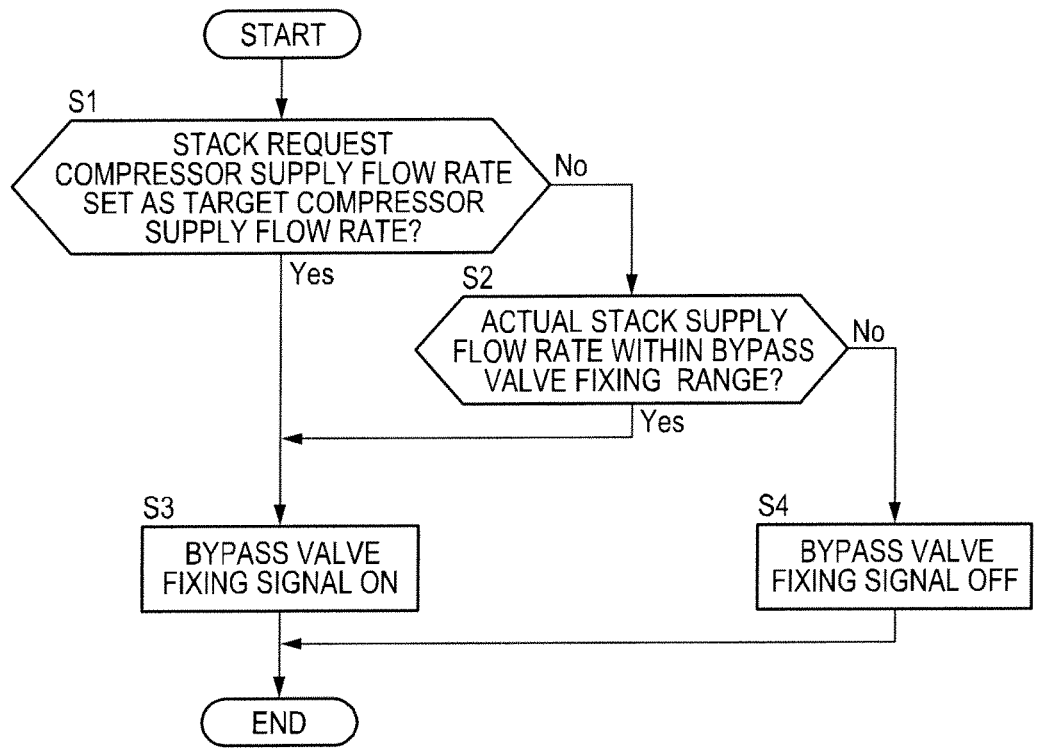
FIG. 4 is a flow chart showing contents of a control executed in a bypass valve fixing signal output unit by a controller, FIG. 5 are time charts showing a control operation of the cathode system according to the present embodiment.

FIG. 4 is a flow chart showing control contents executed in the bypass valve fixing signal output unit 107 by the controller 4.

In Step S1, the controller 4 determines whether or not the stack request compressor supply flow rate is set as a target compressor supply flow rate. The controller 4 performs a processing of Step S3 if the stack request compressor supply flow rate is set as the target compressor supply flow rate. On the other hand, the controller 4 performs a processing of Step S2 if the dilution request compressor supply flow rate is set as the target compressor supply flow rate.

In Step S2, the controller 4 determines whether or not the actual stack supply flow rate is within a bypass valve fixing range. The bypass valve fixing range is a range in which the target stack supply flow rate is set as an upper limit and a flow rate obtained by subtracting a predetermined value from the target stack supply flow rate (hereinafter, referred to as a "fixing range lower limit flow rate") is set as a lower limit. The controller 4 performs the processing of Step S3 if the actual stack supply flow rate is within the bypass valve fixing range. On the other hand, the controller 4 performs a processing of Step S4 if the actual stack supply flow rate is outside the bypass valve fixing range.

In Step S3, the controller 4 sets the bypass valve fixing signal to ON.

In Step S4, the controller 4 sets the bypass valve fixing signal to OFF.

Figure 5:
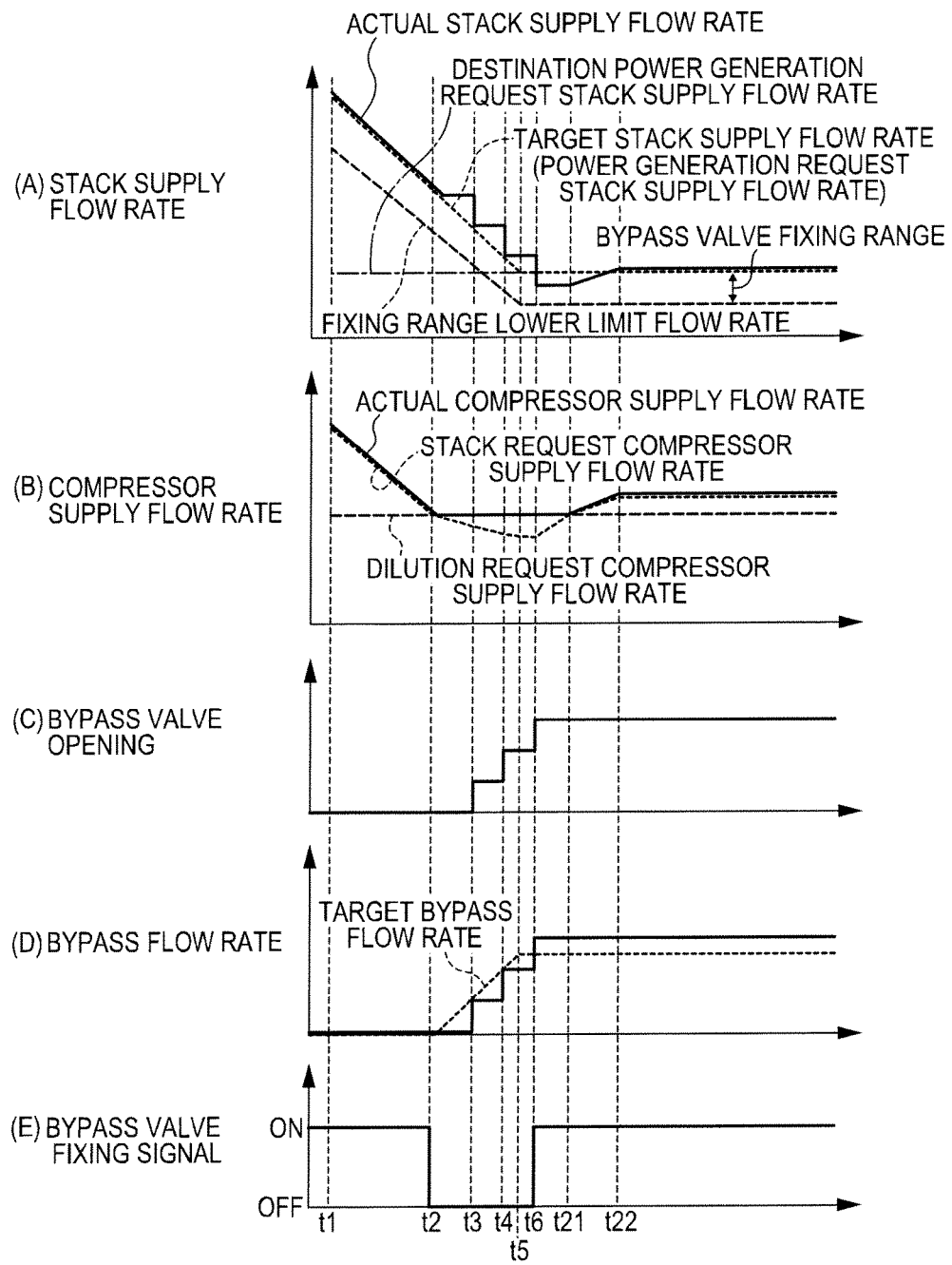

FIG. 5 are flow charts showing a control operation of the cathode system according to the present embodiment.

Since the stack request compressor supply flow rate is larger than the dilution request compressor supply flow rate until time t2 (FIG. 5(B)), the stack request compressor supply flow rate is set as the target compressor supply flow rate. Thus, the bypass valve fixing signal is ON (Yes in S1, S3; FIG. 5(E)).

When the stack request compressor supply flow rate falls below the dilution request compressor supply flow rate and the dilution request compressor supply flow rate is set as the target compressor supply flow rate at time t2, it is determined whether or not the actual stack supply flow rate is within the bypass valve fixing range (No in S1, S2). Since the cathode gas having a flow rate more than the stack request compressor supply flow rate is supplied to the fuel cell stack when the dilution request compressor supply flow rate is set as the target compressor supply flow rate, the actual stack supply flow rate becomes gradually larger than the target stack supply flow rate (FIG. 5(A)). Thus, the actual stack supply flow rate becomes outside the bypass valve fixing range and the bypass valve fixing signal is set to OFF (No in S2, S4; FIG. 5(A), 5(E)) and the bypass valve 26 is opened in a stepwise manner by each unit opening at time t3, time t4 and time t6 similarly to the comparative example (FIG. 5(C)).

At time t6, the bypass valve 26 is opened, whereby the actual stack supply flow rate becomes smaller than the target stack supply flow rate and the actual stack supply flow rate enters the bypass valve fixing range to set the bypass valve fixing signal to ON (Yes in S2, S3; FIG. 5(A), 5(E)). In this way, the opening of the bypass valve 26 is fixed at the current position.

Further, since the dilution request compressor supply flow rate is set as the target compressor supply flow rate and the actual stack supply flow rate is larger than the target stack supply flow rate during a period from time t2 to time t6, the operation of the time-integration of the deviation is stopped in a PI control of a stack request compressor supply flow rate calculation unit 103. Thus, as the deviation between the target stack supply flow rate and the actual stack supply flow rate becomes constant at time t5, the stack request compressor supply flow rate becomes constant (FIG. 5(B)). At time t6, the actual stack supply flow rate becomes smaller than the target stack supply flow rate, whereby the operation of the time-integration of the deviation is resumed in the PI control of the stack request compressor supply flow rate calculation unit 103 and the stack request compressor supply flow rate gradually increases (FIG. 5(B)).

When the stack request compressor supply flow rate exceeds the dilution request compressor supply flow rate at time t21 (FIG. 5(B)), the stack request compressor supply flow rate is set as the target compressor supply flow rate.

Since the actual stack supply flow rate is smaller than the target stack supply flow rate also after time t21 (FIG. 5(A)), the stack request compressor supply flow rate increases and the target compressor supply flow rate increases accordingly.

In this way, the actual stack supply flow rate increases along with an increase in the target compressor supply flow rate (FIG. 5(B)).

As a result, the actual stack supply flow rate can coincide with the target stack supply flow rate at time t22.

Effects of the fuel cell system 100 according to the present embodiment described above are described by supposing a case where the load on the fuel cell system 1 becomes smaller and the dilution request compressor supply flow rate (system request compressor supply flow rate) is set as the target compressor supply flow rate from a state where the stack request compressor supply flow rate is set as the target compressor supply flow rate and the actual compressor supply flow rate is controlled to reach the stack request compressor supply flow rate.

When the dilution request compressor supply flow rate is set as the target compressor supply flow rate, the cathode compressor 22 starts causing the cathode gas having a flow rate more than necessary for power generation (target stack supply flow rate) to flow to the fuel cell stack 1. To control the actual stack supply flow rate to the target stack supply flow rate by causing the cathode gas having a flow rate unnecessary for the fuel cell stack 1 to bypass, the opening of the bypass valve 26 is started based on the actual stack supply flow rate and the target stack supply flow rate.

Here, the opening of the bypass valve 26 is started from a state where the actual stack supply flow rate is larger than the target stack supply flow rate. In the present embodiment, the bypass valve 26 is fixed when the actual stack supply flow rate becomes smaller than the target stack supply flow rate. Thus, it can be suppressed that the cathode gas having a flow rate more than necessary for power generation (target stack supply flow rate) continues to be supplied to the fuel cell stack 1 and the electrolyte membranes are dried.

On the other hand, in a state where the bypass valve 26 is fixed as described above, the actual stack supply flow rate may become short of the target stack supply flow rate and an output voltage may be reduced without the cathode gas of the flow rate necessary for power generation being supplied to the fuel cell stack. Contrary to this, in the present embodiment, a reduction of the output voltage can be suppressed since the shortage of the cathode gas can be compensated by controlling the cathode compressor 22 in the following manner.

Specifically, in the present embodiment, the target stack supply flow rate is calculated based on the load on the fuel cell stack 1 and the stack request compressor supply flow rate for making the actual stack supply flow rate reach the target stack supply flow rate is calculated based on the actual stack supply flow rate and the target stack supply flow rate. Then, larger one of the stack request compressor supply flow rate and the dilution request compressor supply flow rate is set as the target compressor supply flow rate and the compressor is controlled according to that target compressor supply flow rate.

Thus, when the stack request compressor supply flow rate becomes larger than the dilution request compressor supply flow rate, the stack request compressor supply flow rate is set as the target compressor supply flow rate and the cathode compressor 22 is so controlled that the actual compressor supply flow rate reaches the stack request compressor supply flow rate. Since an insufficient flow rate of the cathode gas to the fuel cell stack 1 caused by fixing the bypass valve 26 is compensated by the cathode compressor 22 in this way, the cathode gas of a flow rate necessary for power generation can be supplied to the fuel cell stack 1. Thus, a reduction of the output voltage can be suppressed.

Further, in the present embodiment, to prevent the wind-up phenomenon, the deviation between the target stack supply flow rate and the actual stack supply flow rate is time-integrated only when the actual stack supply flow rate is smaller than the target stack supply flow rate (stack request compressor supply flow rate needs to be increased) in the stack request compressor supply flow rate calculation unit 103 when the dilution request compressor supply flow rate is set as the target compressor supply flow rate in the target compressor supply flow rate setting unit 104. When the actual stack supply flow rate is larger than the target stack supply flow rate (stack request compressor supply flow rate needs to be decreased), the time-integration of the deviation between the target stack supply flow rate and the actual stack supply flow rate is stopped.

Thus, if the drive of the bypass valve 26 is prohibited in a state where the actual stack supply flow rate is larger than the target stack supply flow rate, the time-integration of the deviation is stopped and the actual stack supply flow rate cannot coincide with the target stack supply flow rate when the deviation between the actual stack supply flow rate and the target stack supply flow rate becomes constant as the drive of the bypass valve 26 is prohibited.

Contrary to this, in the present embodiment, the deviation can be time-integrated even if the deviation between the actual stack supply flow rate and the target stack supply flow rate becomes constant by prohibiting the drive of the bypass valve 26 after the actual stack supply flow rate falls below the target stack supply flow rate. Thus, the actual stack supply flow rate can coincide with the target stack supply flow rate by increasing the stack request compressor supply flow rate. Accordingly, it can be suppressed that the electrolyte membrane of each fuel cell becomes excessively dry or excessively wet, therefore a reduction in power generation efficiency can be suppressed.

Although the embodiment of the present invention has been described above, the above embodiment is merely an illustration of one application example of the present invention and not of the nature to limit the technical scope of the present invention to the specific configuration of the above embodiment.

Although the power generation request stack supply flow rate and the wetness request stack supply flow rate are input to the target stack supply flow rate setting unit 102 in the above embodiment, a stack supply flow rate for preventing flooding determined according to the load on the fuel cell stack 1 may be input besides these and a maximum value of these may be set as the target stack supply flow rate. In this way, a flooding prevention request may be added as a request by the fuel cell stack 1 besides the aforementioned power generation request and wetness request.

Further, although the dilution request compressor supply flow rate and the stack request compressor supply flow rate are input to the target compressor supply flow rate setting unit 104 in the above embodiment, a compressor supply flow rate for preventing the surging of the cathode compressor 22 may be input besides these and a maximum value of these may be set as the target compressor supply flow rate. This compressor supply flow rate for preventing the surging is not a request by the fuel cell stack 1, but a target value of a compressor supply flow rate necessary to satisfy a request by the fuel cell system 100 to prevent the surging of the cathode compressor 22. In this way, the surging prevention request may be added as a request by the fuel cell system 100 besides the aforementioned dilution request.

Further, although a feedback control is executed based on the target compressor supply flow rate and the actual compressor supply flow rate in the cathode compressor control unit 105 in the above embodiment, a feedforward control may be executed based on the target compressor supply flow rate.

Further, in the present embodiment, the bypass valve 26 is fixed when the dilution request compressor supply flow rate is set as the target compressor supply flow rate and the actual stack supply flow rate becomes smaller than the target stack supply flow rate. However, the drive of the bypass valve 26 may be limited at that time instead of completely fixing the bypass valve 26.

The present application claims a priority of Japanese Patent Application No. 2012-287934 filed with the Japan Patent Office on Dec. 28, 2012, and all the contents of which are hereby incorporated by reference.

The invention claimed is:

1. A fuel cell system, comprising:
a cathode gas supply passage through which a cathode gas is supplied to a fuel cell stack;
a compressor provided on the cathode gas supply passage;
a bypass passage through which a part of the cathode gas discharged from the compressor is eliminated by bypassing the fuel cell stack;
a bypass valve provided on the bypass passage, the bypass valve being configured to adjust a flow rate of the cathode gas flowing through the bypass passage;
a flow rate sensor detecting a stack supply flow rate, the stack supply flow rate being a flow rate of the cathode gas supplied to the fuel cell stack; and
a programmable controller programmed to:
set a larger one of a stack request compressor supply flow rate and a system request compressor supply flow rate as a target compressor supply flow rate, the stack request compressor supply flow rate being calculated based on a request by the fuel cell stack, the system request compressor supply flow rate being calculated based on a request by the fuel cell system;
control the compressor according to the set target compressor supply flow rate;
control the bypass valve based on the stack supply flow rate and a target stack supply flow rate to be supplied to the fuel cell stack; and
fix the bypass valve or limit driving of the bypass valve when the system request compressor supply flow rate is set as the target compressor supply flow rate and the stack supply flow rate becomes smaller than the target stack supply flow rate.

2. The fuel cell system according to claim 1, wherein the controller is further programmed to:
calculate the target stack supply flow rate based on a load on the fuel cell stack, and
calculate the stack request compressor supply flow rate based on the stack supply flow rate and the target stack supply flow rate so as to cause the stack supply flow rate to reach the target stack supply flow rate.

3. The fuel cell system according to claim 1, wherein the controller is further programmed to:
calculate the stack request compressor supply flow rate by executing a feedback control only when the system request compressor supply flow rate is set as the target compressor supply flow rate and the stack supply flow rate is smaller than the target stack supply flow rate, time-integration of a deviation between the stack supply flow rate and the target stack supply flow rate being calculated in the feedback control.

4. The fuel cell system according to claim 1, further comprising:
- a cathode gas discharging passage through which the cathode gas and cathode off-gas flow, the cathode gas having flowed in the bypass passage, the cathode off-gas being discharged from the fuel cell stack; and
- an anode gas discharging passage through which anode gas discharged from the fuel cell stack is discharged to the cathode gas discharging passage,
- wherein the system request compressor supply flow rate is a target value of a compressor supply flow rate necessary for controlling hydrogen concentration within the cathode gas discharging passage to a predetermined value or less.

5. A fuel cell system, comprising:
- a cathode gas supply passage through which a cathode gas is supplied to a fuel cell stack;
- a compressor provided on the cathode gas supply passage;
- a bypass passage through which a part of the cathode gas discharged from the compressor is eliminated by bypassing the fuel cell stack;
- a bypass valve provided on the bypass passage, the bypass valve being configured to adjust a flow rate of the cathode gas flowing through the bypass passage;
- a stack supply flow rate detecting means configured to detect a stack supply flow rate, the stack supply flow rate being a flow rate of the cathode gas supplied to the fuel cell stack;
- a compressor control means configured to set a larger one of a stack request compressor supply flow rate and a system request compressor supply flow rate as a target compressor supply flow rate, the stack request compressor supply flow rate being calculated based on a request by the fuel cell stack, the system request compressor supply flow rate being calculated based on a request by the fuel cell system, the compressor control means being configured to control the compressor according to the set target compressor supply flow rate;
- a bypass valve control means configured to control the bypass valve based on the stack supply flow rate and a target stack supply flow rate to be supplied to the fuel cell stack; and
- a regulating means configured to fix the bypass valve or limit driving of the bypass valve when the system request compressor supply flow rate is set as the target compressor supply flow rate and the stack supply flow rate becomes smaller than the target stack supply flow rate.

* * * * *